(12) United States Patent
Iwase et al.

(10) Patent No.: US 8,825,246 B2
(45) Date of Patent: Sep. 2, 2014

(54) INDUSTRIAL VEHICLE

(75) Inventors: Shigenori Iwase, Aichi-ken (JP);
Tadashi Yamada, Aichi-ken (JP);
Hiroshi Murata, Aichi-ken (JP);
Nobuyoshi Uematsu, Aichi-ken (JP);
Takashi Ushio, Aichi-ken (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 0 days.

(21) Appl. No.: 13/283,708

(22) Filed: Oct. 28, 2011

(65) Prior Publication Data
US 2012/0109437 A1 May 3, 2012

(30) Foreign Application Priority Data
Oct. 29, 2010 (JP) .................................. 2010-243783

(51) Int. Cl.
 *B60L 11/00* (2006.01)
 *B60W 20/00* (2006.01)
(52) U.S. Cl.
 CPC .................................... *B60W 20/00* (2013.01)
 USPC ........................................................... 701/22
(58) Field of Classification Search
 USPC ........................................................... 701/22
 See application file for complete search history.

(56) References Cited

U.S. PATENT DOCUMENTS

| | | | | |
|---|---|---|---|---|
| 4,289,836 A | * | 9/1981 | Lemelson | 429/61 |
| 5,459,671 A | * | 10/1995 | Duley | 702/63 |
| 5,808,428 A | | 9/1998 | Ito et al. | |
| 5,825,156 A | * | 10/1998 | Patillon et al. | 702/63 |
| 5,929,609 A | * | 7/1999 | Joy et al. | 322/25 |
| 6,413,185 B1 | * | 7/2002 | Baginski et al. | 475/208 |
| 6,835,491 B2 | * | 12/2004 | Gartstein et al. | 429/92 |
| 7,208,914 B2 | * | 4/2007 | Klang | 320/132 |
| 7,538,517 B2 | * | 5/2009 | Alvarez-Troncoso et al. | 320/132 |
| 7,541,781 B2 | * | 6/2009 | Gamboa | 320/152 |
| 7,570,015 B2 | * | 8/2009 | Bansal et al. | 320/106 |
| 7,622,897 B2 | * | 11/2009 | Eberhard et al. | 320/150 |
| 7,629,773 B2 | * | 12/2009 | Eberhard et al. | 320/150 |

(Continued)

FOREIGN PATENT DOCUMENTS

| | | |
|---|---|---|
| EP | 2 173 003 A1 | 4/2010 |
| JP | 07-142099 A | 6/1995 |

(Continued)

OTHER PUBLICATIONS

Extended European Search Report for corresponding EP Patent Application No. 11 186 843.6 issued on Jan. 19, 2012.

*Primary Examiner* — Mary Cheung
*Assistant Examiner* — Anne Mazzara
(74) *Attorney, Agent, or Firm* — Sughrue Mion, PLLC (57) ABSTRACT

An industrial vehicle having a vehicle body includes a battery, an electric motor, an electrolyte level sensor, a vehicle operating with lowered electrolyte level, a vehicle operating time calculator, a data-storing device storing data of the vehicle operating time, an electric motor limiting condition and a motor controller. The electric motor is driven to generate torque. The electrolyte level sensor detects whether or not electrolyte level of the battery is lower than a predetermined level. The vehicle operating time is a time elapsing while the electrolyte level is lower than the predetermined level. The vehicle operating time calculator counts the vehicle operating time in accordance with the detection of the electrolyte level. The electric motor limiting condition limits operation of the electric motor gradually in accordance with the vehicle operating time. The motor controller controls operation of the electric motor based on the electric motor limiting condition.

11 Claims, 6 Drawing Sheets

(56) References Cited

U.S. PATENT DOCUMENTS

| | | | |
|---|---|---|---|
| 7,671,567 B2* | 3/2010 | Eberhard et al. | 320/150 |
| 7,996,098 B2* | 8/2011 | Dickinson et al. | 700/80 |
| 8,267,207 B2* | 9/2012 | Ichikawa | 180/65.1 |
| 8,271,054 B2* | 9/2012 | Bockus et al. | 455/573 |
| 2006/0281000 A1* | 12/2006 | Hayashigawa | 429/63 |
| 2010/0302980 A1* | 12/2010 | Ji et al. | 370/311 |
| 2011/0072280 A1* | 3/2011 | Chiasson et al. | 713/300 |
| 2011/0273129 A1* | 11/2011 | Coe et al. | 320/101 |

FOREIGN PATENT DOCUMENTS

| | | |
|---|---|---|
| JP | 09-023512 A | 1/1997 |
| JP | 2002-120999 A | 4/2002 |
| JP | 2005-269871 A | 9/2005 |
| JP | 2010-070118 A | 4/2010 |
| JP | 2010-074988 A | 4/2010 |

\* cited by examiner

INDUSTRIAL VEHICLE

BACKGROUND OF THE INVENTION

The present invention relates to an industrial vehicle and more particularly to an industrial vehicle equipped with a lead-acid battery.

A battery-powered forklift truck equipped with a battery is driven to travel by a traction motor which is driven by electric power from the battery, and a load handling implement mounted on the battery-powered forklift truck is operated by a loading motor to perform load handling operation. In a case that the battery of the battery-powered forklift truck is provided by a lead-acid battery, the amount of electrolyte solution in the battery is decreased by repeated charging and discharging operations of the battery, and the battery is required to be refilled with electrolyte solution. Allowing the battery to be discharged when the volume of electrolyte solution has been already decreased may promote the deterioration of the battery, so that battery life is reduced. There has been proposed an industrial vehicle equipped with a battery which has a electrolyte level sensor for detecting the liquid level of electrolyte solution in the battery, so that the battery is refilled with electrolyte solution when the liquid level detected by the electrolyte level sensor becomes lower than a predetermined level.

Japanese Patent Application Publication No. 7-142099 discloses an electrolyte level warning device for a battery mounted on an electric vehicle. The electrolyte level warning device disclosed in the above Publication No. 7-142099 includes a battery charger, a vehicle battery chargeable by the battery charger, an electrolyte level sensor arranged for the vehicle battery for detecting electrolyte level of the vehicle battery and a light-emitting diode for warning the vehicle operator of any abnormality occurring in the vehicle battery. The battery charger has a microcomputer and a light-emitting diode.

According to the electrolyte level warning device, the electrolyte level detected by the electrolyte level sensor is lower than the predetermined level when charging of vehicle battery by the battery charger is just started, the microcomputer of the battery charger turns on the light-emitting diode for providing a warning to the vehicle operator. This warning prompts a person in charge of battery charging to perform refilling of the vehicle battery with electrolyte solution.

Since the detection of the electrolyte level is performed when the electrolyte level is static during charging of the vehicle battery, the detection can be performed with high accuracy.

Japanese Patent Application Publication No. 2002-120999 discloses a method and a system for controlling battery information of a battery vehicle. In the system for controlling the battery information according to this Publication, an electrolyte level sensor is arranged for a battery of the battery vehicle for monitoring the amount of electrolyte solution in the battery and operable to generate signals on a periodical basis that are indicative of the amount of electrolyte solution to a controller which determines signals and outputs a warning in response to any abnormality of the battery.

However, the electrolyte level warning device disclosed in the above Publication No. 7-142099 is configure just to give a warning when the electrolyte level of the vehicle battery becomes lower than a predetermined level. Meanwhile, in the method and the system for controlling battery information disclosed in the above Publication No. 2002-120999, a warning is given in response to any abnormality of the electrolyte level, but there is no measures proposed to prevent deterioration of the vehicle battery due to discharging while the battery run short of electrolyte solution.

As an example of measures to prevent deterioration of the vehicle battery due to such discharging, the electric vehicle may be stopped immediately when it is found the amount of electrolyte solution becomes insufficient. In such case, however, it is inconvenient to perform refilling of the battery if the refilling station is far from the stopped vehicle. A warning signal, such as light or sound, indicative of shortage of the electrolyte solution may be overlooked by the operator depending on the surrounding environments of the workplace such as warehouse.

The present invention which has been made in light of the above problems is directed to providing an industrial vehicle which prevents deterioration of the battery of the industrial vehicle due to discharging while the electrolyte level of the battery is low and allows the vehicle operator to recognize positively the condition of the battery that its electrolyte level is lowered.

SUMMARY OF THE INVENTION

In accordance with the present invention, an industrial vehicle having a vehicle body includes a battery, an electric motor, an electrolyte level sensor, a vehicle operating time with lowered electrolyte level, a vehicle operating time calculator, a data-storing device, an electric motor limiting condition and a motor controller. The battery is mounted on the vehicle body. The electric motor is driven by electric power from the battery to generate torque. The electrolyte level sensor detects whether or not electrolyte level of the battery is lower than a predetermined level. The vehicle operating time with lowered electrolyte level is a time elapsing while the electrolyte level is lower than the predetermined level. The vehicle operating time calculator counts the vehicle operating time with lowered electrolyte level in accordance with the detection of the electrolyte level by the electrolyte level sensor. The data-storing device stores data of the vehicle operating time with lowered electrolyte level. The electric motor limiting condition limits operation of the electric motor gradually in accordance with the vehicle operating time with lowered electrolyte level. The motor controller controls operation of the electric motor based on the electric motor limiting condition.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe a forklift truck as an industrial vehicle according to a first preferred embodiment of the present invention with reference to FIGS. 1 through 5. In the following description, the terms such as "forward and backward", "left and right" and "upper and lower" designate directions as viewed by an operator of the forklift truck seated in the operator's compartment and facing forward of the forklift truck.

Figure 1:
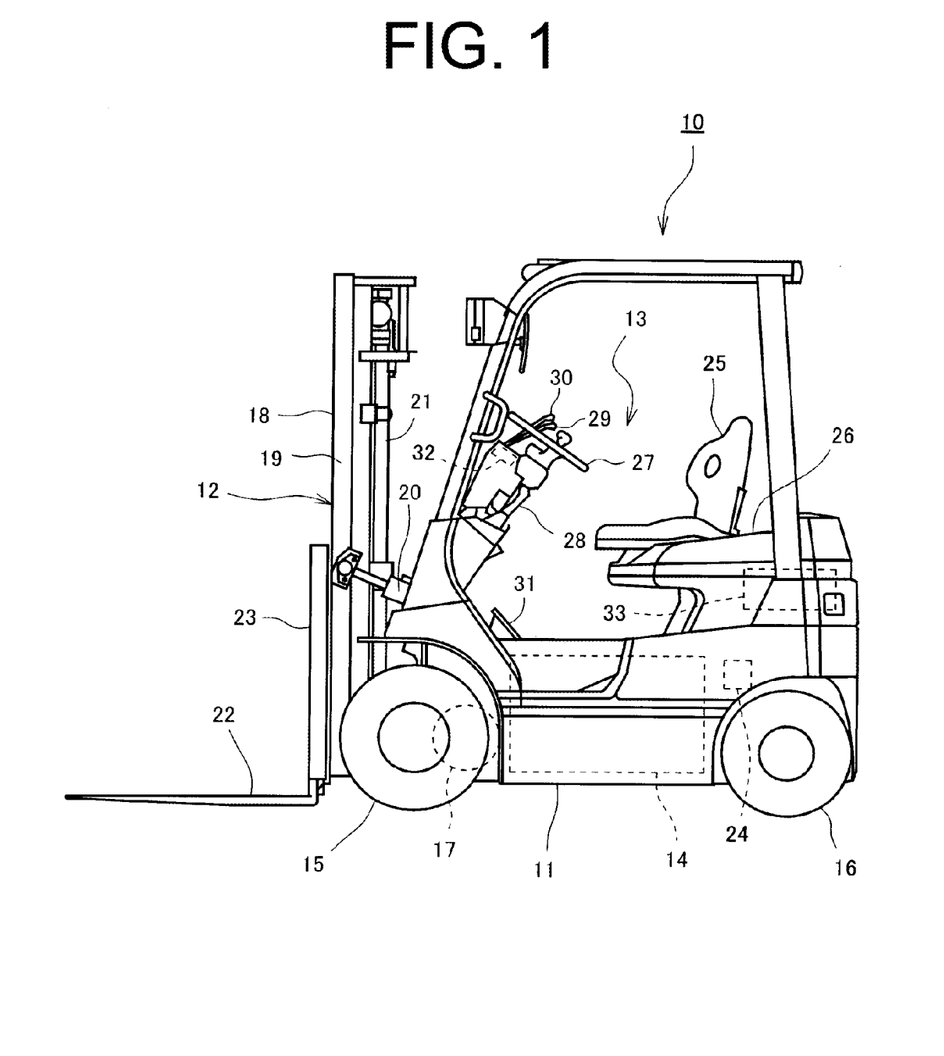
FIG. 1 is a side view of a forklift truck according to a first preferred embodiment of the present invention.

Referring to FIG. 1, reference numeral 10 designates a forklift truck as an industrial vehicle. The forklift truck 10 includes a truck body 11 serving as a vehicle body of the present invention and a load handling implement 12 mounted to the front of the truck body 11. An operator's compartment 13 is provided in the center of the truck body 11, and a battery 14 is accommodated in the truck body 11 under the operator's compartment 13. The battery 14 is provided by a lead-acid battery having electrolyte solution. Drive wheels 15 are arranged in front of the truck body 11 as front wheels, and steered wheels 16 are arranged in rear of the truck body 11 as rear wheels. A traction motor 17 is mounted in the truck body 11 for generating torque as an electric motor. Power transmission mechanism (not shown) is disposed between the traction motor 17 and the drive wheels 15 for transmitting the torque to the drive wheels 15. The forklift truck 10 of the first preferred embodiment is a battery-powered forklift truck driven by electric power from the battery 14 mounted on the truck body 11.

The load handling implement 12 has a mast assembly 18 including paired outer masts 19 and inner masts (not shown). The pair of the left and right outer masts 19 has therebetween the paired inner masts that are slidable relative to the outer masts 19. Hydraulically-operated tilt cylinders 20 are mounted to the outer masts 19, and the mast assembly 18 is tiltable in the forward and backward directions of the forklift truck 10 by the operation of the tilt cylinders 20. Hydraulically-operated lift cylinders 21 are mounted to the inner masts and the inner masts are slidably raised and lowered by the operation of the lift cylinders 21. A pair of left and right forks 22 are mounted to the mast assembly 18 through lift brackets 23 which are arranged so as to be raised and lowered relative to the inner masts. The truck body 11 is equipped with a loading pump (not shown) for supplying hydraulic oil to the lift cylinders 21 and the tilt cylinders 20 and a load handling motor 24 as an electric motor for driving the loading pump.

An operator's seat 25 on which the operator of the forklift truck 10 can be seated is mounted on a seat stand 26 in the operator's compartment 13 of the truck body 11. A steering wheel 27 is disposed in front of the operator's seat 25. A travel lever 28 is provided on the left side of the steering wheel 27 and operated to select forward or backward travel of the forklift truck 10. A lift lever 29 is provided on the right side of the steering wheel 27 and used for operating the lift cylinders 21, and a tilt lever 30 is also provided on the same right side of the steering wheel 27 for operating the tilt cylinders 20.

An accelerator pedal 31 is provided on the floor of the operator's compartment 13 for adjusting traveling speed of the forklift truck 10. Operation of the traction motor 17 is controlled so that the forklift truck 10 travels at a speed corresponding to the degree to which the accelerator pedal 31 is depressed by the operator. The truck body 11 is equipped with a controller 33 for performing various controls of the forklift truck 10. A display unit 32 is provided in front of the steering wheel 27 at such a position adjacent to the lift lever 29 and the tilt lever 30 that provides good visibility for the operator.

Figure 2:
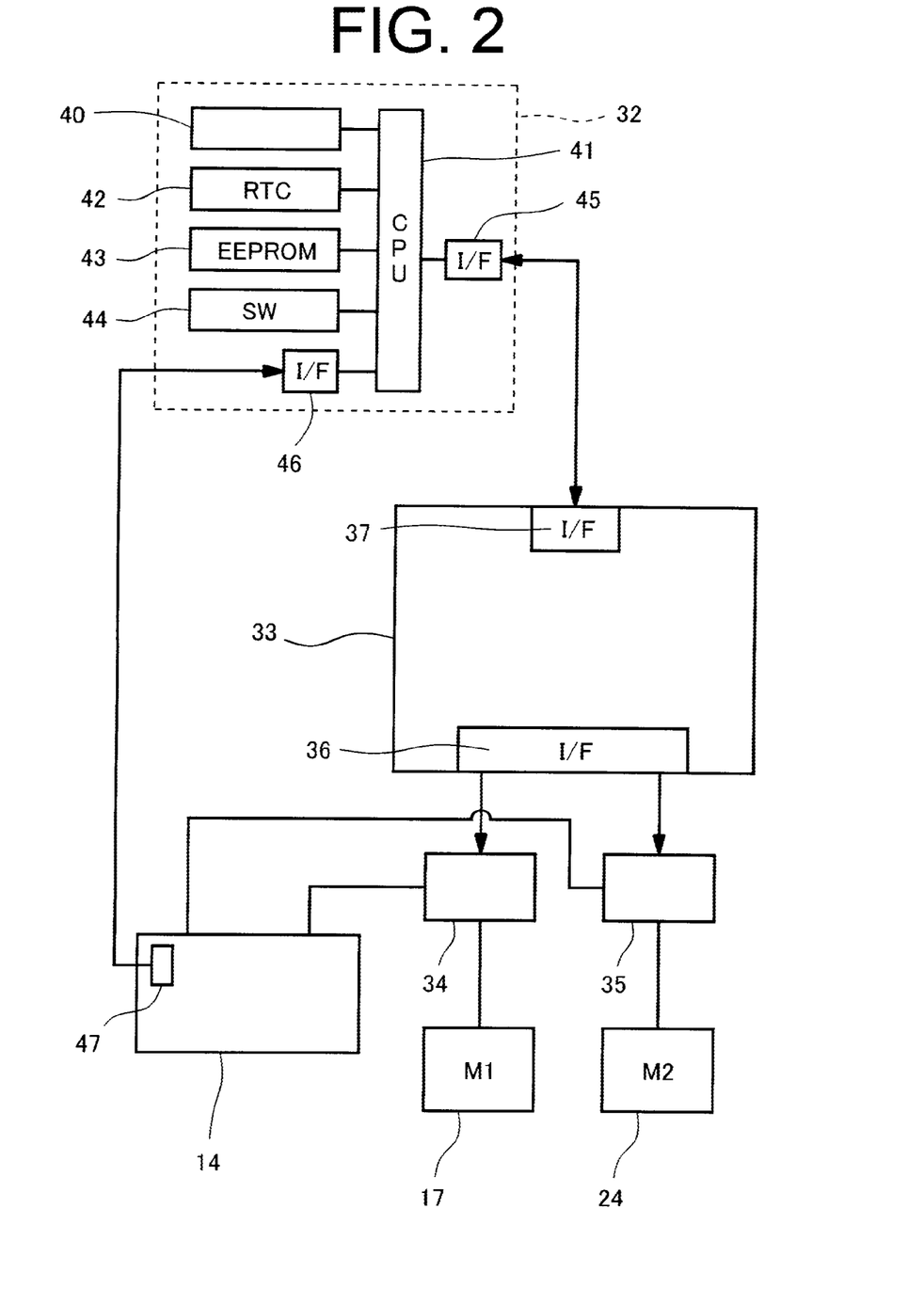
FIG. 2 is a block diagram showing the electrical configuration of the forklift truck of FIG. 1.

The following will describe the electrical control of the forklift truck 10 with reference to FIG. 2. The controller 33 is connected through an interface 36 in a communicable manner to a drive circuit 34 that controls the traction motor 17 and also to a drive circuit 35 that controls the load handling motor 24. The traction motor 17 and the load handling motor 24 are connected through the respective drive circuits 34, 35 to the battery 14 to receive power from the battery 14. The traction motor 17 is driven by the drive circuit 34 which is operable in response to commands from the controller 33, and the load handling motor 24 is also driven by the drive circuit 35 which is operable in response to commands from the controller 33. The controller 33 serves as a motor controller of the present invention and has a central processing unit (CPU) (not shown) operable to perform various control operations in predetermined procedures and a memory for storing various data. A built-in memory (not shown) in the CPU of the controller 33 stores therein programs for a torque limiting condition for limiting the torque of the traction motor 17 gradually. The torque limiting condition for the traction motor 17 serves as an electric motor limiting condition of the present invention.

The controller 33 is connected through an interface 37 in a communicable manner to the display unit 32 provided in the operator's compartment 13. The display unit 32 has a display screen 40 displaying various information including time and serving as a display device of the present invention, a central processing unit (CPU) 41, a real time clock IC 42, a memory 43 and control switches 44. The CPU 41 is connected in a communicable manner to the controller 33 through an interface 45, and various controls are performed through the CPU 41 in predetermined procedures.

The display screen 40 displays battery information such as a capacity of the battery 14, warnings messages such as a warning about parking brake, time-related information such as an accumulated time during which the forklift truck 10 is in key-on state, i.e. when a key is inserted in the forklift truck 10 and a selected traveling mode. The control switches 44 include switches for displaying information, traveling mode selection and setting of charging schedule. The traveling mode is set in stages in accordance with the load levels during traveling and load handling, and there are three travel modes in the first preferred embodiment of the present invention, namely "standard mode (S mode)", "power mode (P mode)" and "high power mode (H mode)". When the forklift truck 10 is to be used for normal traveling or normal load handling operation, "S mode" is selected. When the forklift truck 10 is to be used for traveling or load handling operation whose load is larger than that in "S mode", "P mode" is selected. When the load is larger than that in "P mode", "H mode" is selected.

The real time clock IC 42 is connected to the CPU 41 which provides current time and outputs the time data to the CPU 41. The real time clock IC 42 serves as a current time clock even when the forklift truck 10 is in key-off state where the key is removed from the forklift truck 10. Vehicle operating time according to the first preferred embodiment corresponds to the time elapsing while the forklift truck 10 is in key-on state and calculated by the CPU 41 based on the time data of the real time clock IC 42. Thus, the CPU 41 serves as a vehicle operating time calculator of the present invention. The vehicle operating time in electrolyte level lowered condition corresponds to the time elapsing while the forklift truck 10 is in key-on state and the battery liquid level is lower than a predetermined level. The vehicle operating time in electrolyte level lowered condition corresponds to a vehicle operating time with lowered electrolyte level of the present invention. The vehicle operating time with lowered electrolyte level is calculated by the CPU 41 based on the time data of the real time clock IC 42 as in the case of calculation of the vehicle operating time. The time that elapses while the traction motor 17 is running or the load handling motor 24 is running with lowered electrolyte level is calculated by the CPU 41 based on the time data of the real time clock IC 42. The operating time of the traction motor 17 with lowered electrolyte level in the first preferred embodiment corresponding to a motor operating time with lowered electrolyte level of the present invention.

The memory 43 is connected to the CPU 41 and serves as a data-storing device of the present invention. The memory 43 stores data indicative of the elapsed time and retains data even without being powered on. For the sake of convenience, the memory 43 is shown by a single memory in FIG. 2, but the memory 43 may be provided by plural memories. The memory 43 may be provided by a rewritable non-volatile memory such as Electrically Erasable Programmable Read-Only Memory (EEPROM), but it is not limited to the EEPROM. If the display unit 32 has a backup power system for constantly supplying power to the memory 43, the memory 43 may be provided by a volatile memory, such as Random Access Memory (RAM) and a flush memory.

The CPU 41 of the display unit 32 is connected to an electrolyte level sensor 47 through an interface 46. The electrolyte level sensor 47 is arranged for the battery 14 for detecting the electrolyte level of the battery 14 and transmitting to the CPU 41 a detection signal when the electrolyte level becomes lower than a predetermined level. Since the electrolyte level sensor 47 may not be able to detect the electrolyte level properly when the electrolyte level of the battery 14 is inclined or waved by vibrations developed during traveling of the forklift truck 10, the electrolyte level sensor 47 is so configured that no determination of the electrolyte level is performed while the traction motor 17 is running. In the first preferred embodiment, the electrolyte level sensor 47 is operable to wait for a predetermined time before the detection of the electrolyte level is performed by the electrolyte level sensor 47 after the traction motor 17 is stopped. The time to wait is determined in consideration of the time needed for the electrolyte level to be stabilized. Motor stopped condition in which the traction motor 17 is at a stop means a condition in which no current flows through the traction motor 17 except the condition in which powering or regenerative braking is performed by the traction motor 17.

Figure 3:
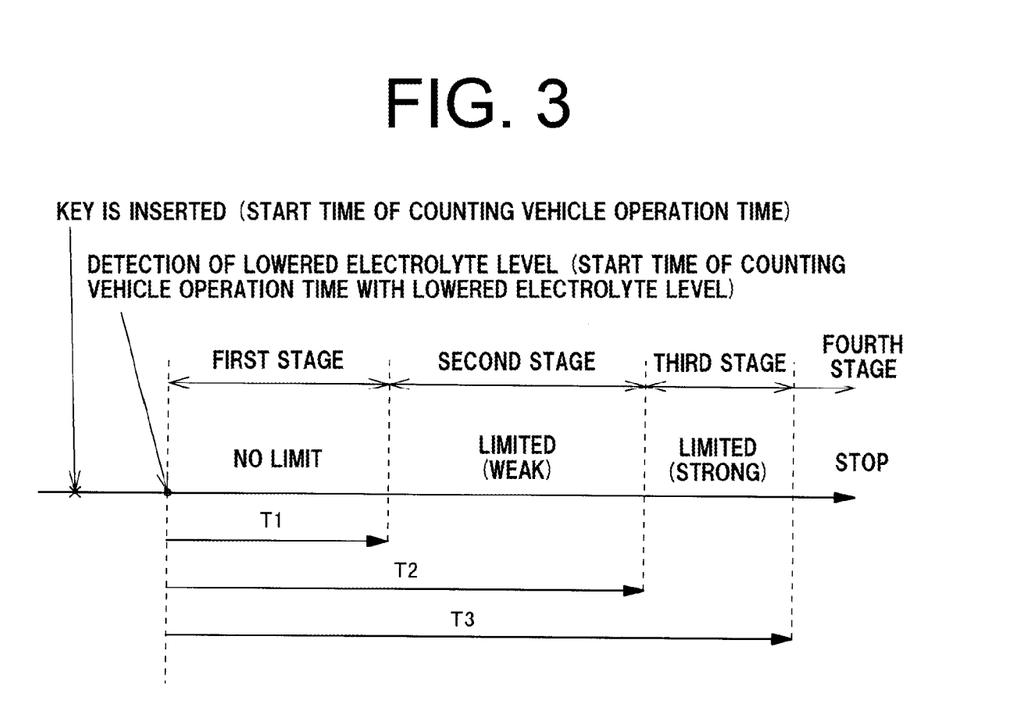
FIG. 3 is a time series graph showing set times for respective different stages of torque limiting condition and limiting manners of the stages for the forklift truck of FIG. 1.

The following will describe a program for the torque limiting condition according to which the torque of the traction motor 17 is limited gradually in accordance with the accumulated time of vehicle operating time with lowered electrolyte level. According to the first preferred embodiment, the torque limiting condition includes a plurality of set times (first through third set times) for plural stages (first through fourth stages) and a plurality of limiting manners (first through fourth limiting manners) in which the torque of the traction motor 17 is limited in each stage. The length of each stage is defined by the set time for the stage. The limited torque of the traction motor 17 is gradually decreased as the stage proceeds to the next stage. Referring to FIG. 3, T1 represents a first set time, i.e. the length of time passed from the start time of counting the vehicle operation time with lowered electrolyte level (for example, 16 hours), T2 represents a second set time, i.e. the length of time passed from the above start time for a time longer than the set time T1 (for example, 36 hours), and T3 represents a third set time, i.e. the length of time passed from the above start time for a time longer than the second set time T2 (for example, 40 hours). Thus, establishing the set times T1 through T3, the times of the first through third stages are also established.

According to the first preferred embodiment, in the first stage corresponding to the first set time T1, no limiting of the torque of the traction motor 17 is performed, which will be referred to as the first limiting manner. In the second stage from the end of the first set time T1 to the end of the second set time T2, the limiting torque is performed in such a manner that the maximum torque of the traction motor 17 is lower than the torque developed by the traction motor 17 when the electrolyte level is normal or higher than a predetermined level, which will be referred as the second limiting manner. In the third stage from the end of the second set time T2 to the end of the third set time T3, the torque limiting is performed in such a manner that the maximum torque of the traction motor 17 is lower than the torque developed by the traction motor 17 during the second stage, which will be referred to as the third limiting manner. In the fourth stage from the end of the third set time T3, the torque limiting is performed in such a manner that the traction motor 17 is forcibly stopped, which will be referred to as the fourth limiting manner. As mentioned above, the torque limiting condition is set by the limiting manners for the traction motor 17 corresponding to the first through fourth stages, but the first limiting manner is not to limit the torque of the traction motor 17.

It is noted that, according to the first preferred embodiment, no specify limiting condition is set for the load handling motor 24. Through it is desirable that any limiting condition should be set for the load handling motor 24 to prevent deterioration of the battery 14 due to discharging while its electrolyte level is low. According to the first preferred embodiment of the present invention, however, the limiting condition is set only for the traction motor 17 because importance is attached to the efficiency to the load handling operation by the load handling motor 24. Supervisor for the forklift truck 10 may have the option of setting various values for the torque limiting condition for the traction motor 17. For example, the torque of the traction motor 17 may be limited in the first stage. Additionally, the number of the set times may be modified, and the duration times for corresponding stages may be modified, and the set time for the respective stages may be changed by increasing the number of the stages of the torque limiting condition more than three.

The following will describe controlling of the forklift truck 10 when the electrolyte level is lowered to the predetermined level. The electrolyte level is lowered to the predetermined level is when the forklift truck 10 is in operation (in key-on state) or when the forklift truck 10 is not in operation (in key-off state). The following will describe controlling of the forklift truck 10 when the electrolyte level is lowered to the predetermined level during operation of the forklift truck 10. When the key is inserted and the forklift truck 10 is set in the key-on state, the CPU 41 starts to count the vehicle operating time based on the time data of the real time clock IC 42. The forklift truck 10 in key-on state is in operation and consumes power of the battery 14 regardless of whether the forklift truck 10 is at a stop or no load handling operation is being performed. When the forklift truck 10 is traveling or operating for load handling, the traction motor 17 and the load handling motor 24 consume a relatively large amount of power.

Whether or not the electrolyte level of the battery 14 is lower than the predetermined level is detected by the electrolyte level sensor 47. The electrolyte level sensor 47 detects the electrolyte level when the traction motor 17 is at a stop where neither powering nor regenerative braking is performed by the traction motor 17 and also at a time when a predetermined length of time has elapsed after the traction motor 17 is stopped. In other words, the detection of the electrolyte level by the electrolyte level sensor 47 is performed when the traction motor 17 is at a stop where no current flows through the traction motor 17. The electrolyte level sensor 47 begins to detect the electrolyte level after elapse of the above predetermined length of time after the traction motor 17 is stopped, i.e. at a time when the electrolyte level of the battery 14 is stabilized without being inclined or waved.

The electrolyte level sensor 47 outputs no detection signal when the electrolyte level is normal or when the level is at or higher than the predetermined liquid level. When the amount of the electrolyte solution of the battery 14 is decreased and the electrolyte level becomes lower than the predetermined level, the electrolyte level sensor 47 transmits to the CPU 41 of the display unit 32 a detection signal indicative of the electrolyte level being lower than the predetermined level. Receiving the detection signal, the CPU 41 starts to count the vehicle operating time with the lowered electrolyte level based on the time data of the real time clock IC 42. The accumulated vehicle operating time with the lowered electrolyte level is continued to be counted until the electrolyte level of the battery 14 becomes higher than the predetermined level by refilling the battery 14 with electrolyte solution. The memory 43 occasionally stores data of the vehicle operating time with lowered electrolyte level counted by the CPU 41. When the CPU 41 starts to count the vehicle operating time with the lowered electrolyte level, a warning indicative of the electrolyte level of the battery 14 being lowered is given and the vehicle operating time with the lowered electrolyte level is shown on the display screen 40 of the display unit 32.

According to the first preferred embodiment of the present invention, the operation of the traction motor 17 is controlled in such a way that its torque is limited gradually in accordance with the vehicle operating time with the lowered electrolyte level based on the torque limiting condition for the traction motor 17. In the first stage where the vehicle operating time with the lowered electrolyte level starts to be counted, no limiting of the torque of the traction motor 17 is performed in accordance with the first limiting manner. In the first stage, a warning indicative of the electrolyte level of the battery 14 being lowered is given and the vehicle operating time with the lowered electrolyte level is shown on the display screen 40. If the operator recognizes that the electrolyte level of the battery 14 becomes lower than the predetermined level in the first stage and moves the forklift truck 10 to a refilling station for refilling of the battery 14, the electrolyte level becomes higher than the predetermined level. When the electrolyte level is thus normal, the electrolyte level sensor 47 outputs no more detection signal indicative of the electrolyte level being lower than the predetermined level. Therefore, the electrolyte level sensor 47 transmits to the CPU 41 of the display unit 32 no detection signal, so that counting of the vehicle operating time with the lowered electrolyte level is stopped and the accumulated vehicle operating time with the lowered electrolyte level is reset by the CPU 41.

If the forklift truck 10 is continued to be used or left as it is without refilling the battery 14 with electrolyte solution, the vehicle operating time with the lowered electrolyte level exceeds the first set time T1, and the operation of the forklift truck 10 proceeds to the second stage. In the second stage, the controller 33 controls the operation of the traction motor 17 in accordance with the second limiting manner. Specifically, the controller 33 controls the drive circuit 34 in such a way that the maximum torque of the traction motor 17 is kept lower than the torque developed when the electrolyte level of the battery 14 is normal (and in the first stage). Since torque generated by the traction motor 17 is directly proportional to the current then flowing in the traction motor 17, the maximum torque of the traction motor 17 may be limited by limiting the current supplied from the battery 14. Therefore, the amount of current from the battery 14 is lower in the second stage than that during operation with normal electrolyte level (and than that in the first stage), so that the deterioration of the battery 14 due to discharging is prevented.

In the second stage, when the maximum torque of the traction motor 17 is limited to be lower than torque developed by the traction motor 17 when electrolyte level of the battery 14 is normal (and lower than in the first stage), acceleration of the forklift truck 10 in the second stage is performed moderately as compared to the case in the first stage when the electrolyte level of the battery 14 is normal, so that the operator can feel low acceleration of the forklift truck 10 in the second stage. Feeling such reduced acceleration in the second stage, the operator recognizes that the electrolyte level of the battery 14 is lower than the predetermined level. The above feel means the difference of operational feel such as acceleration felt physically by the operator while driving the forklift truck 10 excluding the feel experienced visually or auditory. According to the first preferred embodiment, there are three travel modes, namely "standard mode (S mode)", "power mode (P mode)" and "high power mode (H mode)". In the second stage where torque limiting of the traction motor 17 is performed, however, no changing "S mode" to "P mode" or to "H mode" is allowed.

The forklift truck 10 moving to the refilling station for replenishment of the battery in the second stage, the forklift truck 10 can travel with low acceleration. When the battery 14 is refilled with electrolyte solution and the electrolyte level becomes normal, the electrolyte level sensor 47 outputs no more detection signal. Thus, counting of the vehicle operating time with the lowered electrolyte level is stopped and the accumulated vehicle operating time with the lowered electrolyte level is reset, and the torque limiting condition for the traction motor 17 is canceled. Therefore, the forklift truck 10 can travel in normal operation without receiving any torque limitation.

Meanwhile, if the forklift truck 10 is continued to be driven or left as it is without refilling of the electrolyte solution in the second stage, the vehicle operating time with the lowered electrolyte level excesses the second set time, and the operation of the forklift truck 10 proceeds to the third stage. In the third stage, the controller 33 controls the operation of the traction motor 17 in accordance with the third limiting manner. Specifically, in the third stage, the controller 33 controls the drive circuit 34 to drive the traction motor 17 in such a way that the limited maximum torque of the traction motor 17 is kept lower than the limited maximum torque in the second stage, so that the amount of current from the battery 14 is smaller than that in the second stage. In other words, reducing the amount of current from the battery 14 being lower than that in the first stage when the forklift truck 10 is operated with normal electrolyte level of the battery 14, deterioration of the battery 14 due to discharging is prevented.

In the third stage, the maximum torque of the traction motor 17 is set lower than that at the second stage based on the third limiting manner, so that acceleration of the forklift truck 10 in the third stage is performed moderately as compared to the case in the second stage. The operator can feel still low acceleration of the forklift truck 10 in the third stage. Thus, the operator can recognize that the forklift truck 10 is driven to travel with still slowed acceleration. Therefore, the operator may recognize that the condition of the electrolyte level of the battery 14 being lower than the predetermined level continues already for a long period of time. Though the deterioration of the battery 14 is prevented, the operator experiences simulated condition in which the battery 14 is deteriorated.

In the third stage, the forklift truck 10 may be moved to the refilling station by traveling at slower acceleration that in the first and second stages. When the battery 14 is refilled with electrolyte solution to normal electrolyte level, the electrolyte level sensor 47 outputs nor more detection signal, counting of the vehicle operating time with the lowered electrolyte level is stopped and the accumulated vehicle operating time is reset, and the torque limiting condition for the traction motor 17 is canceled. Thus, the forklift truck 10 can travel without torque limitation.

Meanwhile, if the forklift truck 10 is continued to be used or left as it is without refilling electrolyte solution in the third stage, the accumulated vehicle operating time with the lowered electrolyte level excesses the third set time, and the operation of the forklift truck 10 proceeds to the fourth stage. In the fourth stage, the controller 33 controls the operation of the traction motor 17 in accordance with the fourth limiting manner. Thus, supply of current from the battery 14 to the traction motor 17 is stopped and, therefore, deterioration of the battery 14 due to further discharging is prevented. The forklift truck 10 cannot travel any more from the position where the forklift truck 10 is stopped because no current is supplied from the battery 14 to the traction motor 17. Thus, the operator should preferably move the forklift truck 10 to the refilling station before the fourth stage is reached.

Figure 4:
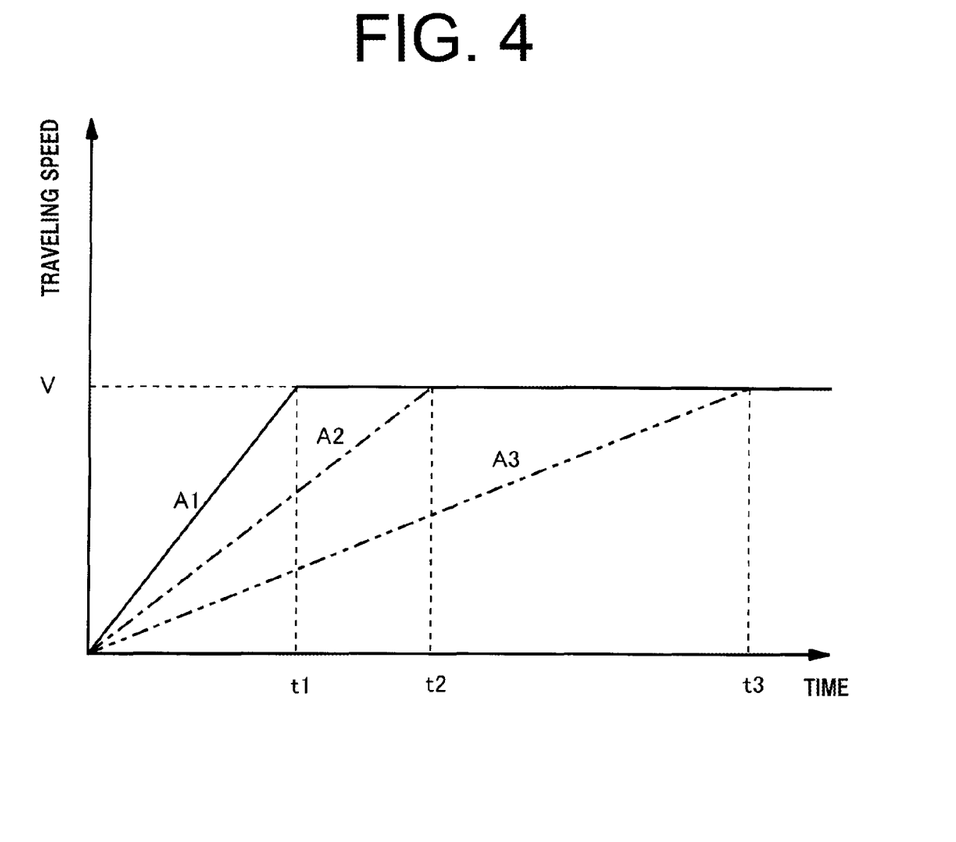
FIG. 4 is a graph showing a manner of limiting torque of a traction motor of the forklift truck of FIG. 1.

FIG. 4 is a graph showing the relation between traveling speed and time of the forklift truck 10 when electrolyte level of the battery 14 is normal (and in the first stage) and in the second and third stages. The line A1 in the graph of FIG. 4 shows when electrolyte level is normal (and in the first stage), and a time t1 for the predetermined traveling speed V is the shortest and the forklift truck 10 can be accelerated in normal operation without receiving any torque limitation. The line A2 in the graph of FIG. 4 shows when the forklift truck 10 is in the second stage, and a time t2 for the predetermined traveling speed V is set longer than the time t1, and the acceleration of the forklift truck 10 is set lower than that of the line A1. The line A3 in the graph of FIG. 4 shows when the forklift truck 10 is in the third stage, and a time t3 for the predetermined traveling speed V is set longer than the time t2, and the acceleration of the forklift truck 10 is set lower than that of the line A2.

The following will describe a case when the electrolyte level has been decreased lower than the predetermined level in the key-off state of the forklift truck 10. In such a state, the forklift truck 10 is not in operation. When the forklift truck 10 becomes in its key-on state, the forklift truck 10 is set in operation, and the electrolyte level sensor 47 detects the electrolyte level. When the electrolyte level of the battery 14 is lower than the predetermined level, the electrolyte level sensor 47 immediately outputs to the CPU 41 of the display unit 32 a detection signal indicative of the electrolyte level being lower than the predetermined electrolyte level.

Receiving the detection signal, the CPU 41 starts to count the vehicle operating time with the lowered electrolyte level. In other words, when the forklift truck 10 is in its key-off state and the electrolyte level is lower than the predetermined electrolyte level, the CPU 41 starts to count the vehicle operating time with the lowered electrolyte level after the forklift truck 10 becomes in its key-on state. After that, the traction motor 17 is controlled based on the torque limiting condition in accordance with the vehicle operating time with the lowered electrolyte level.

If the forklift truck 10 is set in key-off state while the operating time with the lowered electrolyte level is being counted, the vehicle operating time counted before the forklift truck key is set in key-off state is stored and retained in the memory 43. If the forklift truck 10 is set in key-on state after key-off state, counting of the vehicle operating time with the lowered electrolyte level is resumed from the stored data of the vehicle operating time with the lowered electrolyte level.

In the forklift truck 10 of the first preferred embodiment of the present invention, when the electrolyte level of the battery 14 becomes lower than the predetermined level, the vehicle operating time with the lowered electrolyte level of the battery 14 begins to be counted, and the torque of the traction motor 17 is limited gradually in accordance with the vehicle operating time with the lowered electrolyte level based on the torque limiting condition. Limiting the torque of the traction motor 17 gradually based on the torque limiting condition, the operating performance of the forklift truck 10 is limited gradually in such a way that acceleration performance of the forklift truck 10 is limited as compared to a condition in which the electrolyte level is normal. Therefore, discharging of the battery 14 during traveling of the forklift truck 10 when the electrolyte level is low is limited, thereby restricting the deterioration of the battery 14 due to discharging. The operator feels that the limited acceleration of the forklift truck 10 as compared to the case when the electrolyte level is normal, thus allowing the operator to recognize the electrolyte level being lowered.

The forklift truck 10 of the first preferred embodiment according to the present invention offers the following advantageous effects.

(1) When the electrolyte level of the battery 14 is lower than a predetermined level, the CPU 41 starts to count the vehicle operating time with the lowered electrolyte level of the traction motor 17. The torque of the traction motor 17 of the forklift truck 10 is limited gradually in accordance with the vehicle operating time with the lowered electrolyte level, so that discharging of the battery 14 during traveling of the forklift truck 10 is limited accordingly, and the deterioration of the battery 14 due to discharging is prevented. During accelerating the forklift truck 10, the operator can feel slowed acceleration of the forklift truck 10 based on the torque limiting condition and recognize that the electrolyte level of the battery 14 is lowered. This may help the operator of the forklift truck 10 to take appropriate measures by moving the forklift truck 10 to a station for refilling the battery with electrolyte solution.

(2) Since the limiting manners and the set times for the respective stages of the torque limiting condition may be variable, or set as desired, the maximum torques, the set times for the respective stages, and the number of the stages may be variable. For example, the limiting manner may be set according to the requirement of the supervisor of the forklift truck 10 to place the priority on the battery protection by allowing the torque of the traction motor 17 to be limited in the first stage as well. Alternatively, the torque limiting condition may be variable such that the forklift truck 10 may be allowed to travel in the fourth stage for attaching the priority to the working efficiency of the forklift truck 10.

(3) The electrolyte level sensor 47 is operable to detect the condition of the battery 14 in which the electrolyte level is lower than a predetermined level when the traction motor 17 is at a stop and no current flows through the traction motor 17. The condition of the traction motor 17 in which no current flows therein is the same as the condition in which no powering or no regenerative braking is performed by the traction motor 17. The truck body 11 in such a state is not traveling or moving, but remains stationary and, therefore, the electrolyte solution of the battery 14 is neither inclined nor waved. Thus, the electrolyte level sensor 47 may detect accurately the electrolyte level of the battery 14.

(4) When the electrolyte level becomes lower than the predetermined level and control to limit the torque of the traction motor 17 gradually is performed, the vehicle operating time with the lowered electrolyte level is shown on the display screen 40 of the display unit 32. Such operator's visual recognition of the lowered electrolyte level of the battery 14 helps the operator to feel the slowed acceleration of the forklift truck 10, and the operator may recognize time elapsing while the battery liquid level is lower than a predetermined level.

(5) The forklift truck 10 has three different traveling modes, namely "standard mode (S mode)", "power mode (P mode)" and "high power mode (H mode)". When the torque limiting of the traction motor 17 is being performed, no changing from "S mode" to "P mode" or to "H mode" is allowed. Thus, the operator perceives the lowered electrolyte level of the battery 14 by recognizing that changing between the travel modes cannot be performed or is limited.

Figure 5:
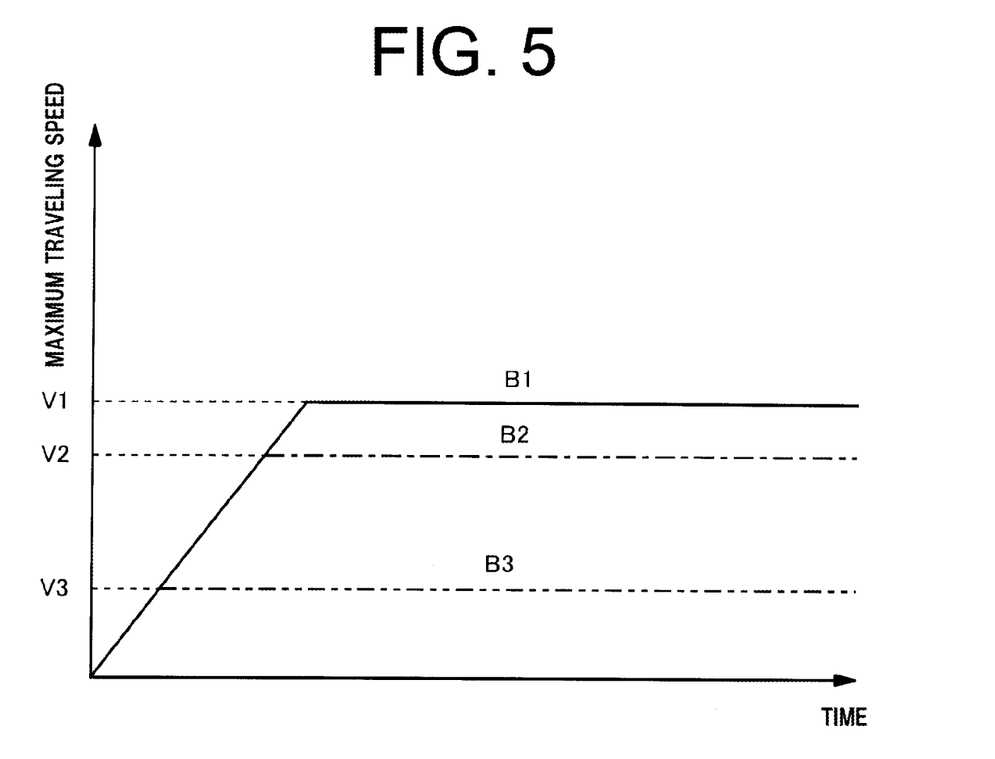
FIG. 5 is a graph showing a manner of limiting traveling speed of the forklift truck of FIG. 1.

According to the first preferred embodiment of the present invention, the torque limiting condition for limiting the torque of the traction motor 17 gradually in accordance with the vehicle operating time with the lowered electrolyte level serve as the electric motor limiting condition of the present invention. Alternatively, instead of the torque limiting condition, a traveling speed limiting condition according to which the traveling speed of the forklift truck 10 is limited gradually may be used as the electric motor limiting condition of the present invention. In this case, a plurality of set times (first through third predetermined times) corresponding to the respective stages (first through fourth stages) and also to the limiting manners (first through fourth limiting manners) are established. The limited maximum traveling speed of the forklift truck 10 is decreased as the stage proceeds to the next stage. FIG. 5 is a graph showing the limiting manners for the respective stages. Line B1 in the graph of FIG. 5 corresponding to a condition in which the electrolyte level of the battery 14 is normal (and also to the first stage) shows that there is no limitation of traveling speed for the forklift truck 10 and, therefore, the forklift truck 10 can travel at the maximum traveling speed indicated by V1. Line B2 in the graph in FIG. 5 corresponding to the second stage shows that maximum traveling speed V2 is about 80 percent of the maximum traveling speed V1 of the first stage. Line B3 of the graph corresponding to the third stage shows that maximum traveling speed V3 is about 30 percent of the maximum traveling speed V1 of the first stage. In the case that the traveling speed of the forklift truck 10 is limited gradually as described above, the forklift truck 10 can be accelerated in the same manner as in normal operation. However, limiting the maximum traveling speed of the forklift truck 10, the acceleration period of the forklift truck 10 is shortened, thereby limiting the discharging of the battery 14.

Controlling the traction motor 17 in accordance with the traveling speed limiting condition, the deterioration of the battery 14 due to discharging with lowered electrolyte level may be prevented. During traveling of the forklift truck 10, the operator may recognize that the battery 14 is in electrolyte level lowered condition by feeling the limited maximum traveling speed. This helps to prompt the operator of the forklift truck 10 to take appropriate measures against battery discharging, e.g. moving the forklift truck 10 to a refilling station in a factory or a warehouse. In the case of limiting the traveling speed of the forklift truck 10 gradually, it may be so controlled changing from "S mode" to "P mode" or to "H mode" is not allowed and, therefore, the operator may recognize that changing between the traveling modes cannot be performed or is limited.

According to the first preferred embodiment, the vehicle operating time with the lowered electrolyte level while the forklift truck 10 is in its key-on state is counted. Alternatively, the vehicle operating time with the lowered electrolyte level may be counted during the time other than when the forklift truck 10 is in its key-on state. For example, the vehicle operating time with the lowered electrolyte level may be the time of operation of the traction motor 17 with the electrolyte level of the battery 14 lower than a predetermined level. In this case, the torque of the traction motor 17 may be limited gradually based on the torque limiting condition corresponding to the vehicle operating time with the lowered electrolyte level as the motor operating time with the lowered electrolyte level.

In the case that the motor operating time with the lowered electrolyte level is used as the vehicle operating time with the lowered electrolyte level, the torque of the traction motor 17 is limited gradually based on the torque limiting condition showing in FIGS. 3 and 4. A large percentage of power consumption of the battery 14 is due to vehicle operating time with the lowered electrolyte level of the traction motor 17. Limiting the torque of such traction motor 17 in stages based on the torque limiting condition corresponding to the vehicle operating time with the lowered electrolyte level, deterioration of the battery 14 due to discharging while the electrolyte level is lowered is prevented. In the case when the motor operating time with the lowered electrolyte level is used as the vehicle operating time with the lowered electrolyte level, the traveling speed may be limited gradually based on the traveling speed limiting condition shown in FIG. 5.

Figure 6:
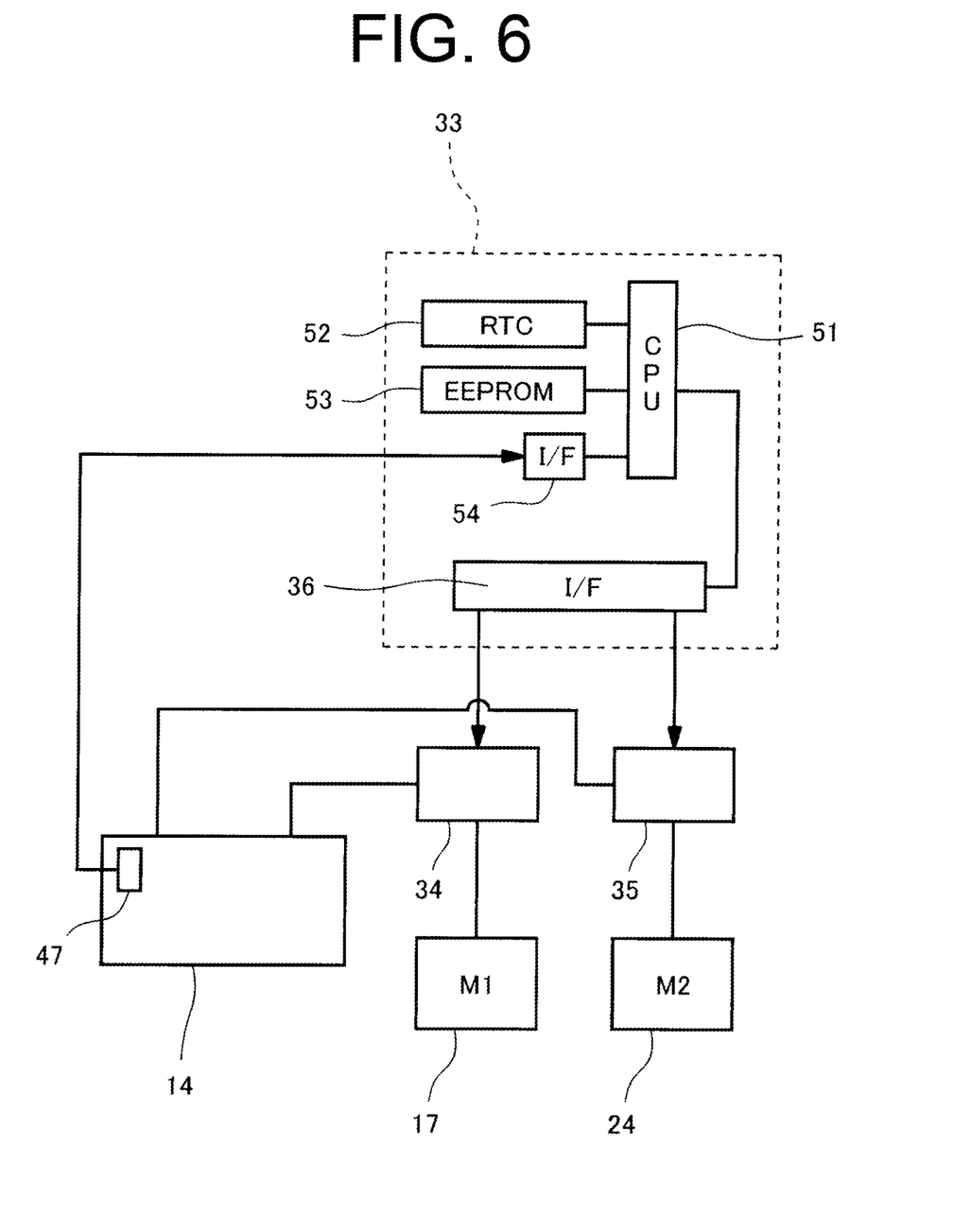
FIG. 6 is a block diagram showing the electrical configuration of a forklift truck according to a second preferred embodiment of the present invention.

The following will describe a forklift truck according to a second preferred embodiment of the present invention with reference to FIG. 6. The forklift truck of the second preferred embodiment differs from that of the first preferred embodiment in that no display unit is provided. The reference numerals used in describing the first preferred embodiment will be used to denote similar elements or parts of the second preferred embodiment and the description thereof will be omitted. Referring to FIG. 6, the controller 33 of the second preferred embodiment has a real time clock IC 52, a memory 53 and a CPU 51 which is connected to the real time clock IC 52 and the memory 53. The CPU 51, the real time clock IC 52 and the memory 53 of the second preferred embodiment have the same functions as the CPU 41, the real time clock IC 42 and the memory 43 of the first preferred embodiment. The program for the torque limiting condition to limit the torque of the traction motor 17 in stages is stored in a memory (not shown) embedded within the CPU 51. An electrolyte level sensor 47 arranged for the battery 14 is connected to the CPU 51 of the controller 33 through an interface 54.

As in the case of the first preferred embodiment, the control of the forklift truck 10 when the electrolyte level of the battery 14 is lower than a predetermined level is performed such that the vehicle operating time with the lowered electrolyte level is counted and the torque of the traction motor 17 is limited gradually in accordance with the torque limiting condition corresponding to the vehicle operating time with the lowered electrolyte level. According to the second preferred embodiment, no display is provided for warning of the lowered electrolyte level and indication of elapsed time of the lowered electrolyte level condition. However, the operator can recognize the lowered electrolyte level by feeling slowed acceleration while driving the forklift truck 10.

The present invention is not limited to the above-described embodiments but it may be modified into various alternative embodiments as exemplified below.

According to the preferred embodiments, limiting condition for the forklift truck 10 includes limiting of torque of the traction motor and traveling speed is the electric motor limiting condition to limit torque or traveling speed of the traction motor, or to limit performance to the traction motor. According to the present invention, however, the electric motor limiting condition may be applied to the loading motor. In this case, discharging of the battery with the lowered electrolyte level is limited as compared to a case that only the traction motor is controlled, so that battery deterioration due to discharging in the electrolyte level lowered condition is further inhibited.

According to the predetermined embodiments, time data is obtained by using the real time clock IC. Alternatively, time data may be obtained by using the CPU provided in the display unit or using a period controlling clock mechanism of the CPU of the controller. In this case, the real time clock IC may be dispensed with, and the same advantageous effects as in the case of using the real time clock IC are obtained.

According to the first preferred embodiment of the present invention, the vehicle operating time with the lowered electrolyte level is displayed on the display screen of the display unit. Alternatively, instead of displaying the vehicle operating time with the lowered electrolyte level, the remaining time of countdown before the current stage proceeds to the next stage may be displayed on the display screen. Thus, the operator may recognize the remaining time of the current stage accurately as compared to a case that the remaining time of the current stage is calculated roughly from the displayed data of the remaining capacity of the battery measured by battery capacitance meter or the vehicle operating time, thereby prompting the operator to refill the battery with electrolyte solution. The remaining time of the current stage may be calculated from the relation between the set times and the vehicle operating time with the lowered electrolyte level.

Although the embodiments of the present invention have been described above with reference to a battery-powered forklift truck, the present invention is not limited to such industrial vehicle, but the present invention is applicable to various industrial vehicle including a construction vehicle such as battery-powered construction vehicle.

What is claimed is:

1. An industrial vehicle including a vehicle body comprising:
    a battery mounted on the vehicle body;
    an electric motor driven by electric power from the battery to generate torque, the electric motor being a traction motor by which the industrial vehicle is driven to travel;
    an electrolyte level sensor detecting whether or not electrolyte level of the battery is lower than a predetermined level;
    a vehicle operating time with lowered electrolyte level being a time elapsing while the industrial vehicle is in a key-on state and the electrolyte level is lower than the predetermined level;
    a vehicle operating time calculator counting the vehicle operating time with lowered electrolyte level in accordance with the detection of the electrolyte level by the electrolyte level sensor;
    a data-storing device storing data of the vehicle operating time with lowered electrolyte level;
    an electric motor limiting condition for limiting operation of the electric motor gradually in accordance with the vehicle operating time with lowered electrolyte level; and
    a motor controller controlling operation of the electric motor based on the electric motor limiting condition.

2. The industrial vehicle according to claim 1, wherein the electric motor limiting condition includes a plurality of set times for plural stages and a plurality of limiting manners for the stages in which the operation of the electric motor is limited in each stage, the length of each stage is defined by the set time for the stage, the set times and the limiting manners are variable.

3. The industrial vehicle according to claim 2, wherein the current stage proceeds to the next stage when the vehicle operating time with lowered electrolyte level exceeds the set time for the current stage.

4. The industrial vehicle according to claim 2, wherein torque of the electric motor is limited in each stage in the limiting manner, or traveling speed of the industrial vehicle is limited in each stage in the limiting manner.

5. The industrial vehicle according to claim 4, wherein the limited torque of the electric motor is decreased as the stage proceeds to the next stage.

6. The industrial vehicle according to claim 4, wherein the limited traveling speed of the electric motor is decreased as the stage proceeds to the next stage.

7. The industrial vehicle according to claim 2, wherein the industrial vehicle further includes a display device for displaying time, the display device displays at least one of the vehicle operating time with lowered electrolyte level and a remaining time of the set time before the current stage proceeds to the next stage.

8. The industrial vehicle according to claim 1, wherein the electric motor limiting condition is a torque limiting condition for limiting maximum torque of the electric motor gradually in accordance with the vehicle operating time with lowered electrolyte level or the electric motor limiting condition is a traveling speed limiting condition for limiting maximum traveling speed of the industrial vehicle gradually in accordance with the vehicle operating time with lowered electrolyte level.

9. The industrial vehicle according to claim 8, wherein the maximum torque of the electric motor is decreased as the stage proceeds to the next stage.

10. The industrial vehicle according to claim 8, wherein the limited maximum traveling speed of the industrial vehicle is decreased as the stage proceeds to the next stage.

11. The industrial vehicle according to claim 1, wherein the detection of the electrolyte level by the electrolyte level sensor is performed when the electric motor is at a stop where no current flows through the electric motor.

* * * * *